United States Patent [19]

Rumball

[11] 4,001,471
[45] Jan. 4, 1977

[54] THERMOPLASTIC SEAM BETWEEN JUXTAPOSED EDGES OF BLANK MATERIAL

[75] Inventor: Kenneth Francis Rumball, Great Bookham, England

[73] Assignee: Airfix Industries Limited, London, England

[22] Filed: May 28, 1975

[21] Appl. No.: 581,671

[30] Foreign Application Priority Data

June 26, 1974 United Kingdom ............. 28442/74

[52] U.S. Cl. .................................. 428/60; 428/81; 428/121; 229/48 T
[51] Int. Cl.² ...................... B32B 3/04; B32B 3/20; B65D 5/42
[58] Field of Search ............... 428/58, 60, 81, 121, 428/57, 83; 229/48 R, 48 T

[56] References Cited
UNITED STATES PATENTS

| | | | |
|---|---|---|---|
| 2,789,745 | 4/1957 | Negoro | 229/48 R |
| 3,093,287 | 6/1963 | Stark | 229/48 R |
| 3,194,473 | 7/1965 | Rumberger | 229/48 R |
| 3,341,048 | 9/1967 | Carbone | 229/48 R |

*Primary Examiner*—Philip Dier
*Attorney, Agent, or Firm*—Scrivener, Parker, Scrivener and Clarke

[57] ABSTRACT

A container is made by folding a blank to define a receptacle, clamping the blank between a core tool and a cavity tool and seaming juxtaposed blank edges by injection moulding, one tool defining a recess overlying the juxtaposed edges and at least one preferred flow path being defined in that recess offset relative to the juxtaposed edges so that injected material clamps the edge region over which the preferred flow path lies against the other tool face opposite the recess to prevent injected material penetrating between the blank over which the preferred flow path lies and that other tool face.

3 Claims, 4 Drawing Figures

THERMOPLASTIC SEAM BETWEEN JUXTAPOSED EDGES OF BLANK MATERIAL

This invention is concerned with improvements in and relating to the production of composite articles. A composite article is an article which comprises at least one blank of flexible sheet material such as paper, card, plastic foil or metal foil, on which an injection moulding has been formed. The moulding may be a seam of thermoplastic material between two juxtaposed blank edges, a peripheral rim in the case of a lid or a lip in the case of a container. Typical known plastics for use as injection moulded material in accordance with the present invention are described in patent to Santangelo U.S. Pat. No. 3,493,458.

In particular this invention is concerned with forming a seam between juxtaposed blank edges.

It has been found that when forming for example a seam between juxtaposed edges of blank material, if a recess is provided in a mould tool overlying those edges, injected material fed to that recess will tend to seek a path of least resistance. One of the regions offering least resistance will often be found to be at the edges over which the recess lies because the depth of the recess is greater there where no blank material lies between the base of the recess and the other mould tool and, being in the central region, transversely, of the recess it will be the hottest region and consequently the material there will flow more readily. The injected material will tend therefore to travel along those edges more rapidly than along that part of the recess overlying the edge regions of the blank adjacent the edges. The travelling front of the injected material over an edge region may tend to cause the material of the blank to develop a travelling wave ahead of the front because the space between the base of the recess and the other mould tool is greater than the thickness of the blank material thereby leaving room for that blank material to lift away from the surface of the other mould tool against which it otherwise abuts. If a travelling wave is set up, the injected material at the centre of flow can find its way to the region under the wave in the blank material. Even though the amount of material which penetrates below the wave is very small, the result, where the seam is being formed internally of the article, is a reject because the injected material which finds its way to the external surface of the article results in a blemish on the outside of the article.

According to this invention there is provided a method of making a composite article including the step of forming a seam between juxtaposed edge regions of flexible blank sheet material, comprising the steps of positioning and clamping said edge regions between clamping surfaces of two mould tools with respective edges juxtaposed, the clamping surface of one of those tools including a recess spanning the juxtaposed edges and defining a flow path for material which is to form the required seam, and injecting material along that flow path to bond the edges together, the recess being shaped to provide a preferred flow path for injected material over at least one edge region where material will flow along the seam in a region spaced from the edges and clamp that edge region against the other mould tool. The preferred flow path is preferably formed by locally spacing the base of the recess further from the surface of the other tool than in the region spanning the juxtaposed edges.

In the case of two co-planar edge regions, a preferred flow path will be provided over each edge region.

According to the present invention there is further provided a composite product including edges of blank sheet material joined by a seam of plastic material, the seam overlying the edges and edge regions adjacent the edges, the part overlying at least one edge region including a portion extending along that region of a thickness greater than the thickness of the seam overlying the edges and spaced from those edges.

According to this invention there is further provided a mould for making a composite article in which the mould includes a pair of mould tools each including a clamping surface which with the clamping surface of the other tool will clamp blank edge regions with edges thereof juxtaposed, one surface including a recess defining a flow path for material to be injected to form a seam joining those edges, said recess including at least one region, spaced from the region where said edges will lie, where the base of the recess is spaced from the surface of the other mould tool more than at the region where the edges will lie to form a preferred flow path for injected material.

In order that the present invention may be well understood there will now be described two embodiments thereof, given by way of example only, reference being had to the accompanying drawings, in which.

Figure 1:
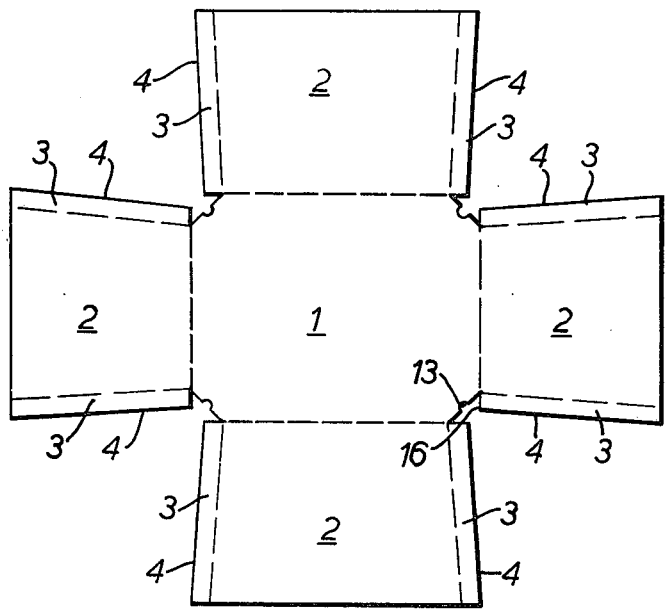
FIG. 1 is a plan view of a blank.

The blank in FIG. 1 includes an end base panel 1, four wall panels 2 and eight corner panels 3.

The blank is folded to the final shape of the end product with edges 4 of the adjacent corner panels juxtaposed and is clamped in that folded condition between a pair of mould tools 5, 6. These define a blank clamping cavity corresponding to the folded blank and a mould cavity corresponding to a seam 7 at each corner region and a mould cavity corresponding to a peripheral lip 8.

Figure 2:
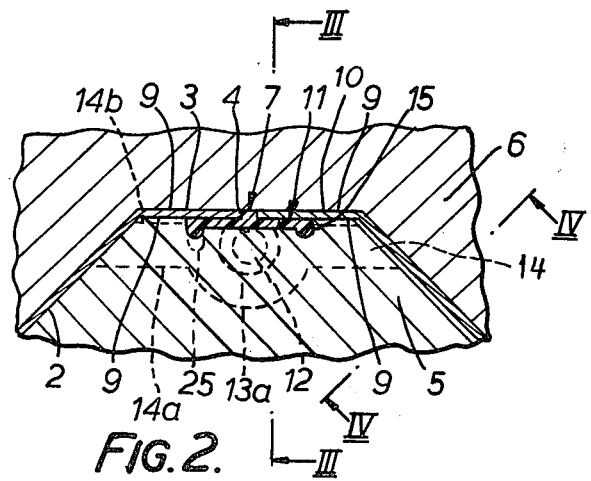
FIG. 2 is a transverse section through part of the blank constrained to final shape in a mould and a seam between two juxtaposed blank edges.

Each seam mould cavity (FIG. 2) is located between two regions 9 of the blank clamping cavity in each of which an edge region of a corner panel 3 is clamped. Between those regions 9 one mould clamping surface 10 forms a back-up surface and the other mould clamping surface includes a recess 11 forming a flow path for material which will form the seam. Edge regions of the blank lie over the back-up surface and, because of the clamping at the regions 9 necessary to confine injected seam forming material to the seam cavity, the edge regions may tend to curl away from the back-up surface into the recess.

Figure 3:
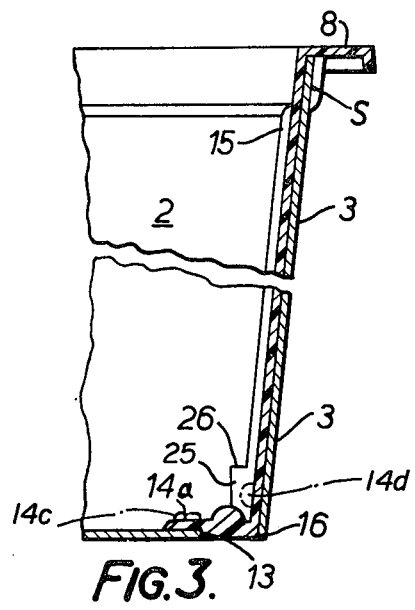
FIG. 3 is a longitudinal section through a seam moulding of a completed container, separate from the mould tools of FIG. 2, and taken substantially on the line III—III of FIG. 2.

A pin gate 12 is situated at the corner of the end panel area of the cavity tool 6 and the end panel 1 is cut away at 13 in this region to accommodate that pin gate. When plastic material is fed through the pin gate it fills the region of the cut away 13 and an L-section recess 14 in the core tool spanning end panel 1 and the adjacent panel edges 4 to seam them to the end panel. The limb of this seam overlying panel 1 is shown at 14a in FIG. 2 and the limb overlying panels 3 is shown at 14b in FIG. 2. The blank is preferably cut so that, when folded up, the ends 16 of side panels 4 extend to the base of the cavity tool (FIG. 3). Thereby these ends are forced by plastic in recess 14 against the cavity tool surface.

When the plastic enters the recess 11 it would, if the section of the cavity were uniform transversely, have a tendency to flow more quickly up the centre. This may in part be due to the fact that any gap between the blank edges 4 will locally provide an easier flow path and in part to the centre of the flow being hotter. The tendency for faster flow at the centre is even more marked if the recess is thicker at the centre of the seam overlying edges 4 which might be thought desirable for greater strength of seam over the blank edges.

The flow front at one or each side over the edge region of a corner panel 3 may cause the blank edge region at that side to ripple or form an advance wave in the blank material ahead of that front. Now if the centre flow is ahead of the flow front at one edge region, this central flow can pass under the ripple or wave and between that edge region and the cavity tool where the wave has lifted away from the back-up surface of the cavity tool. Thereby plastic appears on the outside of the blank which is unacceptable.

To defeat this the recess is shaped to provide preferred flow paths to keep the front of the flows at the sides over the edge regions sufficiently close to the flow front at the centre of the recess that any wave created by a side flow is ahead of the front of the centre flow while, in the region of the centre flow front, the edge regions are already being urged against the back-up surface by the side flows. It is preferred to achieve this by increasing the spacing of the base of the recess from the back-up surface in regions 15 spaced to either side of the region of the recess spanning the blank edges. These regions 15 which comprise channels in the base of the recess 11 start above the bottom edges so that they do not present ready flow paths to those ends and thereby round those ends. A similar result as that produced by the enlarged regions 15 may be provided for the L-section produced by the previously described recess 14 in the core tool. Here the easier flow path would be provided by recesses of greater thickness in the core tool spaced to the side of the L-section recess 14 and, if desired, a similar recess could be provided in the vertical portion of the recess 14, above the ends 16 of the side panels 3. These further recesses may define beads as indicated in Phantom at 14c and 14d in FIG. 3.

To maintain a hot spot at the pin gate the core tool surface opposite the pin gate is recessed at 13a.

Figure 4:
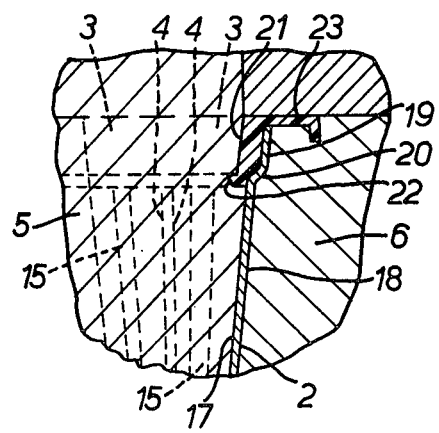
FIG. 4 is a section through the lip region while still in the mould along line IV—IV of FIG. 3.

To give a desirable finish at the upper edges of the blank adjacent the peripheral lip, the mould is shaped to give the effect illustrated by FIG. 4. Here the cavity tool is recessed at 19 with a curved part 20 into which the edge region of the blank remote from the base panel can be deformed without rupture while the core tool is recessed at 21 and this recess includes a feed bar recess 22 which communicates with the regions 15 of the seam cavities between which it extends. Opposite each flow path recess 11, the recess 19 is interrupted by an upward continuation of the back-up surface. Hence the straight outside face of the blank indicated at S in FIG. 3. Thus when plastic flows up the recess 11 it stays on the inside of the blank edge regions. On reaching recess 22 it flows into that recess still on the inside of the blank. This presses the blank outwards into recess 19. The flow continues along the recess 22 now enlarged by deformation of the blank into recess 19 and as this flow path is filled so the plastic flows up recess 21 and out into the limb 23 of the cavity to form lip 8, passing over the edge of the blank which is already pressed against the surface of recess 19 of cavity tool 6 so that there is no flow on to the outside surface of the blank around the free edge.

Where it is desired to include an anti-wedging stop to prevent the containers when nested jamming together, one region 15 is increased in depth as at 25 to provide a step 26 on which the base of a nested container can abut.

What is claimed is:
1. A composite article comprising a seam joining edge regions of sheet material, the seam being formed from thermoplastic material which has been injection moulded in situ in relation to those edge regions, the moulding spanning those edge regions and being bonded to each and having over one of said edge regions at least and extending along that edge region a part which is of greater thickness than that part of the moulding overlying the adjacent edge.
2. An article according to claim 1 in which the seamed edge regions are coplanar, and the moulding includes a bead running along each edge region, spaced from the edge of that edge region and forming the part of greater thickness.
3. An article according to claim 1 in which the edge regions are not coplanar, the moulding is generally of L-section each limb overlying and bonded to one of the edge regions and one of those limbs including a bead forming the region of greater thickness.

* * * * *